United States Patent [19]

Hirono

[11] 3,850,143

[45] Nov. 26, 1974

[54] METHOD OF HANDLING SHRIMP
[75] Inventor: Yosuke Hirono, Crystal River, Fla.
[73] Assignee: Ralston Purina Company, St. Louis, Mo.
[22] Filed: Sept. 5, 1972
[21] Appl. No.: 286,099

[52] U.S. Cl. ................................................. 119/2
[51] Int. Cl........................................... A01k 61/00
[58] Field of Search ........................................ 119/2

[56] References Cited
UNITED STATES PATENTS
| 3,473,509 | 10/1969 | Miyamura | 119/2 |
| 3,477,406 | 11/1969 | Fijinaga | 119/2 |
| 3,735,737 | 5/1973 | Budge | 119/4 |

OTHER PUBLICATIONS
Cook & Murphy "Rearing Penaeid Shrimp from Eggs to Postlarvae" pp. 283–288

Primary Examiner—Hugh R. Chamblee
Attorney, Agent, or Firm—W. Dennis Drehkoff; Virgil B. Hill; Lawrence J. Hurst

[57] ABSTRACT

A method of spawning, collecting, hatching and shipping shrimp by controlling the selection of spawned eggs to obtain only the most desirable, and placing the desired eggs into a hatching tank for hatching. The shrimp are then hatched, the nauplii shrimp collected and placed into a shipping container. The temperature of the water in which the nauplii shrimp are shipped is maintained in a predetermined range to control the growth of the shrimp so they do not progress beyond the beginning of the protozoeal stage of growth during the shipment thereof.

21 Claims, No Drawings

METHOD OF HANDLING SHRIMP

BACKGROUND OF THE INVENTION

The prior art is familiar with the desirability of commerically hatching and raising shrimp. In the past in order to obtain the necessary shrimp eggs and shrimp nauplli for a shrimp growing operation, it was necessary for gravid female shrimp upon capture to be transferred to a hatchery operation. The shipment of such gravid female shrimp required rather close controls to be maintained over the oxygen supplied thereto and that they be maintained in a refrigerated or cooled condition. This cooling or refrigeration of the gravid female shrimp was necessary to inhibit or prevent the premature spawning of the female shrimp and hatching of eggs during the holding and shipment thereof. Thus, such shipment of gravid female shrimp is very costly requiring special shipping containers to maintain the proper controls and conditions for the shrimp. It is desirable to eliminate this expense if possible.

Additionally, by subjecting the gravid female shrimp to this handling and refrigerated condition over a period of time, there was experienced uncertainty as to the quantity and quality of eggs hatched from the female shrimp. In fact there have been many instances where the gravid female shrimp would not spawn after such handling. Thus, the prior methods of handling the gravid female shrimp to obtain the necessary eggs could result in the operator proceeding with the time consuming and expensive handling of the female shrimp from the catch to the hatching operation and thereafter an unsatisfactory hatch or in fact no hatch at all could be obtained. Thus, a substantial risk factor exists concerning the handling of the female shrimp to obtain viable shrimp eggs. If this risk could be eliminated or lessened, such that a better probability of obtaining a good spawning and hatching of shrimp eggs is possible, it would provide a substantial economic advantage to the operator.

It is believed that the poor quantity and quality of eggs hatched is attributable to these changes in environment or conditions over extended periods of time to which the gravid female shrimp are subjected. Further, there is always an uncertainty concerning the viability of any eggs hatched by the female shrimp. Thus, it would be desirable to improve the efficiency of the hatchery operation and more particularly to eliminate the uncertainty of the handling of shrimp eggs. Therefore, it would be desirable to eliminate the uncertainty of the spawning of female shrimp, to reduce the handling of the female shrimp, to control the processing of shrimp eggs so that only the most desirable or viable eggs are utilized and to ship only the nauplii shrimp to improve the hatchery operation. Since under the present invention, the hatchery operator would be receiving shrimp in the nauplli stage of development, the present invention serves to improve and allow a more efficient operation of the hatchery.

It is therefore one of the principal objects of applicant's invention to eliminate this high risk method of handling the gravid female shrimp and eggs and particularly to eliminate the shipment of the gravid female shrimp or eggs to a hatchery operation. Also, it is one of the objects of the present invention to control or manage the quality of the eggs, and viability of nauplii shrimp such that only viable nauplii shrimp are carried forth in the process. Further, applicant's method of spawning, collecting, hatching and shipping nauplii shrimp eliminates much of the uncertainty of the hatchery operation heretofore previously experienced.

Additionally, applicant's method of handling the female shrimp, the eggs and the nauplii shrimp enables greater control to be exercised over the hatchery operation, and produces less loss of shrimp through the hatchery operation.

SUMMARY OF THE INVENTION

Briefly, the present invention comprises the method of spawning, collecting, and hatching shrimp eggs wherein gravid female shrimp are placed into individual spawing tanks, allowed to remain in the tanks for a predetermined period of time sufficient for the eggs to be spawned, an aliquot sample of the eggs are checked to determine the viability thereof, the viable eggs are then maintained at a predetermined temperature to control the hatching of the eggs. Following the hatching of the eggs, the shrimp nauplii are collected by means of phototropism and/or by screening, placed in a shipping container and shipped to be received at the hatchery operation before they progress beyond the beginning of the protozoeal stage of growth.

DESCRIPTION OF THE PREFERRED EMBODIMENTS

Gravid female shrimp are obtained or captured such as on shrimp boats and separated from the other shrimp as is well known in the art. The captured gravid female shrimp are then placed in the spawning chambers or holding tanks for the subsequent spawning operation. If desired, the spawning may be accomplished right on the shrimp boats, but preferably the captured females will be placed into refrigerated or cooled water maintained at a temperature generally in the range of 14° – 22° C. If the female shrimp are held in this condition, it is for a relatively short period of time, such that the change in environment does not adversely effect the female shrimp or adversely effect the spawning thereof. As is well known, the preferable temperature for the spawning of the female shrimp is 27° – 29° C. and the female shrimp may be immediately placed in water at that temperature or acclimated thereto after the refrigerated holding. The individual spawning chambers or holding tanks into which the gravid female shrimp are placed is sufficiently large to accommodate the female shrimp with room to move and with a sufficient oxygen supply for the female shrimp to spawn. This is particularly important in being able to properly control or monitor the eggs spawned by each of the individual female shrimp and also for maintaining the eggs segregated prior to checking the eggs to determine the viability thereof. The female shrimp are maintained in the spawning tank for a sufficient tank period of time for the eggs to be spawned. As is well known in the art, it may be necessary to shock the female shrimp in order for spawning to occur. Preferably, the container will be shaped to enable the eggs to collect near the bottom thereof for easy removal. However, if desired the tank may also be utilized for the hatching of the shrimp eggs. By maintaining the eggs of a particular female shrimp separate from the eggs of other female shrimp, it is possible to better control the quality of the eggs for further processing.

Following the spawning of the eggs, the gravid female is then removed from the tank and preferably the eggs are collected therefrom. This is desirable since this eliminates problems arising from the trash and debris which normally occurs in the spawning of shrimp. An aliquot sample of the eggs is then selected from each of the individual containers and subjected to microscopic determination for selecting the most desirable or viable eggs of those spawned. Such a selection of the desired or viable eggs is well within those skilled in the art and permits the undesirable eggs to be discarded such that the hatchery operation will not be processing undesirable eggs which is a disadvantage of many prior art techniques of processing eggs. Following the selection of the desired or viable eggs, the eggs are then desirably subjected to a washing operation with pasteurized or sterilized sea water. This washing operation may be carried out for a number of occurrences with the more washing steps being utilized the more optimum condition for minimizing contamination of the spawned eggs. This washing operation not only minimizes disease and contamination of the eggs, but also serves to eliminate the mucous and debris normally occurring in the spawning and serves to prevent the eggs from sticking together during the subsequent treatment thereof. A washing step wherein the eggs are washed three to six times with pasteurized or sterilized sea water has proven quite satisfactory for carrying out this step of the operation. If desired, the eggs may be separated from the debris by means of filtering the hatch water or the filtering and washing may be used in combination depending upon the operator's preference.

Following the accumulation of the eggs and desirably the washing thereof, the eggs are then concentrated in a hatching tank up to about 5,000 eggs per milliliter of water in the container and preferably 800 – 2,000 eggs per milliliter of water. Desirably, the salinity of the water will be in the range of 23 – 36 parts per thousand and preferably 28 – 31 parts per thousand. The temperature of the water in which the eggs are placed for hatching will be controlled depending upon the length of time it is desired to hold the shrimp eggs prior to the hatching thereof. The eggs will normally hatch within about 12 to 15 hours from spawning if the water is maintained at a temperature of about 26° – 30° C.

If it is desired to hold the eggs for a period of time prior to the hatching thereof, this may be achieved by maintaining the eggs in water at a temperature or below a temperature which is sufficient to prevent the hatching thereof and desirably below a temperature of approximately 26° C. Generally, the lower the temperature of the water in which the eggs are placed, the longer the period of time before hatching will occur. By controlling the temperature of the water it is possible to regulate the hatching of the shrimp eggs such that the shrimp will be hatched or received when desired. Thus, by controlling the temperature of the water in which the eggs are placed, it is possible to regulate or control the time at which the eggs will hatch. If it is desired that the eggs be maintained in an unhatched condition, the water temperature would be maintained at a temperature in the range of about 14° – 25° C. When it is desired to hatch the eggs, they are then allowed to become acclimated to a temperature which is desirable for hatching, which is normally considered to be approximately 26° – 30° C.

Since only viable eggs have been selected, a greater number of eggs introduced into each of the hatching tanks will be hatched. After the shrimp are hatched the nauplii shrimp are collected by means of phototropism or by means of filtering, such as passing the water through a 98 – 120 mesh filter to collect the nauplii. By utilizing this collection method for the nauplii shrimp, it is possible to collect and separate them from the debris which is present following the hatching of shrimp.

Following the hatching of the shrimp and the collection of the nauplii shrimp by phototropism or by filtering, the nauplii shrimp are placed in a shipping container at a concentration up to about 100 nauplii shrimp per milliliter of pasteurized or sterilized sea water in the container and preferably 20 – 50 nauplii shrimp per milliliter of water. The salinity of the pasteurized or sterilized sea water is controlled in the range of 23 – 36 parts per thousand and preferably 28 – 31 parts per thousand. Further, the oxygen level within the container is controlled to obtain a sufficient atmosphere to support the nauplii shrimp during the shipment thereof prior to the sealing of the container. This is readily achieved by sealing the container with a super-saturated sea level atmosphere in the container. This sealed container may either be of the rigid type, such as a glass or plastic vial or jar, or may be a plastic bag, such as polyethelene. The temperature of the water in which the nauplii shrimp are placed for shipment will be controlled depending upon the length of time to be required for the shipment of the nauplii shrimp. It should be understood that the growth of the nauplii shrimp should be controlled such that the shrimp do not progress beyond the beginning of the protozoeal stage of growth during the shipment thereof. This is important since shrimp which have progressed into the protozoeal stage of growth require additional forms of feed to support life. Generally, the temperature of the water during shipment of the nauplii will be in the range of about 16° to 30° C. and preferably 21° to 26° C. By controlling the temperature of the water, the development of the shrimp through the nauplii stage may be retarded or slowed to accommodate different shipping times. Thus, development of nauplii into protozoeal shrimp which normally takes approximately 36 – 40 hours in water at approximately 27° C. may be retarded to obtain a longer period of time for shipment such as 59 – 64 hours when the water is approximately 23° C. As is readily apparent the temperature of the water in which the nauplii are shipped will be controlled depending upon the anticipated shipping time and the stage of nauplii development desired when the hatchery operator receives the shrimp. As previously discussed, it is important that the shrimp not progress beyond the beginning of the protozoeal stage of growth during the shipment thereof. Upon receipt of the nauplii shrimp, they would then be placed in the hatchery and the growth of the shrimp controlled as is well known in the art.

From the foregoing, it is now apparent that a novel method of spawning, and hatching shrimp eggs, followed by collecting and shipping nauplii shrimp, has been disclosed and that other modifications and variations may be made in the method set forth herein by way of example without departing the spirit of the invention as defined by the claims as follows.

We claim:

1. A method of spawning, hatching and shipping nauplii shrimp comprising the steps of: placing gravid female shrimp into spawning tanks; retaining the gravid female shrimp in the tank for a period of time sufficient for the eggs to be spawned; collecting the spawned eggs from the tanks; hatching the spawned eggs to obtain a nauplii shrimp; collecting the nauplii shrimp; placing the nauplii shrimp into a shipping container and controlling the temperature of the sea water during the shipment of the nauplii shrimp to prevent the shrimp from progressing beyond the beginning of the protozoeal stage of growth during the shipment thereof and thereafter acclimating the shrimp in sea water under desired conditions for the subsequent growth thereof.

2. The method according to claim 1 wherein the concentration of the nauplii shrimp in the container is up to about 100 nauplii per milliliter of sea water and the temperature of the sea water during the shipment of the nauplii shrimp is in the range of about 21° to 26° C.

3. The method according to claim 1 wherein the concentration of the nauplii shrimp in the container is up to about 100 nauplii shrimp per milliliter of sea water.

4. The method according to claim 3 wherein the nauplii shrimp are collected from the hatching tank by means of phototropism.

5. The method according to claim 3 wherein the gravid female shrimp is held at a temperature of about 14° – 22° C. in individual spawning tanks prior to the spawning thereof.

6. The method according to claim 3 wherein the concentration of the nauplii shrimp in the container is in the range of 20 – 50 nauplii shrimp per milliliter of water.

7. The method according to claim 1 wherein the spawned eggs are placed in water having a temperature within the range of about 21° – 25° C. to control the hatching thereof.

8. The method according to claim 7 including the step of washing the eggs following the collection thereof and prior to the placement in the hatching tank.

9. A method of shipping nauplii shrimp comprising the steps of: placing nauplii shrimp into a container at a concentration up to about 100 nauplii shrimp per milliliter of sea water in the container and controlling the temperature of the sea water during the shipment of the nauplii shrimp at a temperature to prevent the shrimp from progressing beyond the beginning of the protozoeal stage of growth during the shipment thereof within the time normally required for development of nauplii into protozoea shrimp.

10. The method according to claim 9 wherein the concentration of the nauplii shrimp in the container is in the range of 20 – 50 nauplii shrimp per milliliter of sea water.

11. The method according to claim 10 wherein the salinity of the water in the container is maintained in the sea range of 23 – 36 parts per thousand.

12. The method according to claim 9 wherein the temperature of the sea water containing the nauplii shrimp is within the range of about 21° – 26° C.

13. A method of spawning, hatching and shipping nauplii shrimp comprising the steps of: placing gravid female shrimp into individual spawning tanks; retaining the gravid female shrimp in the tank for a period of time sufficient for the eggs to be spawned; selecting the viable eggs from those spawned; placing the viable eggs into a hatching tank; hatching the spawned eggs to obtain nauplii shrimp collecting the nauplii shrimp; placing the nauplii shrimp into a container at a concentration of 20 – 50 nauplii shrimp per milliliter of sea water in the container; and controlling the temperature of the sea water during the shipment of the nauplii shrimp in the range of 21° – 26° C. to prevent the shrimp from progressing beyond the beginning of the protozoeal stage of growth during the shipment thereof and thereafter acclimating the shrimp in sea water under desired conditions for the subsequent growth thereof.

14. The method according to claim 13 wherein the spawned eggs are placed in sea water having a temperature within the range of about 21° – 25° C. to control the hatching thereof.

15. The method according to claim 13 wherein the nauplii shrimp are collected from the hatching tank by means of phototropism.

16. The method according to claim 13 wherein the nauplii shrimp are collected from the hatching tank by filtering the sea water through containing the shrimp a 98 – 120 mesh filter.

17. A method of handling nauplii shrimp prior to the development of the beginning of the protozoea stage of growth of the shrimp comprising maintaining the nauplii shrimp at a concentration up to about 100 nauplii shrimp per milliliter of sea water at a temperature within the range of about 21° – 26° C. for a predetermined period of time and thereafter acclimating the nauplii shrimp in sea water under desired conditions for the subsequent growth thereof.

18. A method of handling nauplii shrimp prior to the development of the beginning of the protozoea stage of growth of the shrimp comprising the steps of: placing the nauplii shrimp in a container at a concentration up to about 100 nauplii shrimp per milliliter of sea water in the container, controlling the temperature of the sea water in the container at a temperature to prevent the nauplii shrimp from progressing beyond the beginning of the protozoea stage of growth within the time normally required for development of nauplii into protozoea shrimp and thereafter acclimating the shrimp in sea water under desired conditions for the subsequent growth thereof.

19. The method according to claim 18 wherein the temperature of the sea water is controlled to prevent the nauplii from progressing into the protozoea stage of development in less than 40 hours.

20. The method according to claim 18 wherein the temperature of the sea water containing the nauplii shrimp is controlled within the range of about 21° – 26° C.

21. The method according to claim 18 wherein the concentration of the nauplii shrimp in the container is in the range of 20 – 50 nauplii shrimp per milliliter of sea water.

* * * * *

UNITED STATES PATENT OFFICE
CERTIFICATE OF CORRECTION

Patent No.      3,850,143       Dated  November 26, 1974

Inventor(s)   Yosuke Hirono

It is certified that error appears in the above-identified patent and that said Letters Patent are hereby corrected as shown below:

Column 2, line 15, the word "spawing" should read "spawning".

Column 5, line 6, "a" should be omitted.

Column 5, line 18 the word "shrimp" should go after the word "nauplii".

Column 5, line 59, the word "sea" should go after the first word "the".

Column 5, line 60, the word "sea" should be omitted.

Column 6, line 27, "containing the shrimp" should go after the word "water".

Column 6, line 33, "in sea water" should go before the word "at".

Signed and sealed this 22nd day of April 1975.

(SEAL)
Attest:

RUTH C. MASON
Attesting Officer

C. MARSHALL DANN
Commissioner of Patents
and Trademarks